United States Patent [19]

Minai

[11] Patent Number: 4,765,592
[45] Date of Patent: Aug. 23, 1988

[54] MATERIAL FOR VALVE SEATS
[75] Inventor: Yasuo Minai, Yamanashi, Japan
[73] Assignee: Kitz Corporation, Tokyo, Japan
[21] Appl. No.: 38,823
[22] Filed: Apr. 15, 1987
[51] Int. Cl.$^4$ ................................................ F16K 5/00
[52] U.S. Cl. ...................................... 251/368; 251/315
[58] Field of Search .................................. 251/315, 368

[56] References Cited

U.S. PATENT DOCUMENTS

| | | | |
|---|---|---|---|
| 2,762,601 | 9/1956 | Clarle | 251/368 |
| 2,950,081 | 8/1960 | Steinbuch et al. | 251/368 |
| 2,965,123 | 12/1960 | Hulslander | 251/368 |
| 3,123,096 | 3/1964 | Notaro et al. | 251/368 |
| 3,188,048 | 6/1965 | Sutherland | 251/368 |
| 3,401,916 | 9/1968 | Scaramucci | 251/368 |
| 3,504,886 | 4/1970 | Hulslander | 251/368 |
| 3,771,766 | 11/1973 | Scapes et al. | 251/368 |
| 4,539,113 | 9/1985 | Tomita et al. | 210/323.2 |
| 4,571,165 | 2/1986 | Murata | 418/178 |

FOREIGN PATENT DOCUMENTS 58-51481 11/1983 Japan.

Primary Examiner—A. Michael Chambers
Attorney, Agent, or Firm—Wenderoth, Lind & Ponack

[57] ABSTRACT

A material for valve seats is a composite material comprising a base material composed of PTFE and 3 to 30% by weight of PFA based on the total amount of the base material, and 5 to 30% by weight of glass fiber or 5 to 25% by weight of carbon fiber based on the total amount of the composite material. When the glass fiber is used as an additive, 5 to 25% by weight of powdered graphite or 3 to 10% by weight of molybdenum disulfide based on the total amount of the composite material is further added as occasion demands.

10 Claims, 2 Drawing Sheets

MATERIAL FOR VALVE SEATS

BACKGROUND OF THE INVENTION AND RELATED ART STATEMENT

The present invention relates to a novel material for seats of valves used for controlling the flow of water, oil or gas pertaining to the ordinary life field and/or for regulating the flow of any fluid used in the field of the manufacturing industry such as chemical industry, petrochemical industry, pharmaceutical industry, drink and food industry, etc. and, more particularly, relates to a material for ball seats attached to ball valves.

Generally, the ball seats of this type are made of polytetrafluoroethylene (hereinafter referred to briefly as "PTFE") solely or in combination with glaass fiber, carbon fiber or such metal powder as bronze powder. Further, as disclosed in Japanese Utility Model Publication No. 58-51481, ball seats molded of a copolymer of tetrafluoroethylene and perfluoroalkylvinylether (hereinafter referred to simply as "PFA") are also known to the art.

As is well known, PTFE exhibits considerably low frictional resistance, has a particular material characteristic of its static friction being not greater than its dynamical friction, and is excellent in resistance to wear, chemicals and temperature. This is why PTFE has found widespread acceptance as a material for seats of ball valves. For this reason, PTFE is specified as a material for ball seats in The Japan Petroleum Institute's Standard, "Flanged Ball Valves for Petroleum Industry" (JPI-7S-48-74) and also in The British Standard, "Steel ball valves for petroleum, petrochemical and allied industries" (BS 5351:1976).

However, the ball seats made of PTFE are inferior in resistance to creep and, when being used under high pressure, gives rise to creep, thereby undergoing permanent deformation and resulting in malfunction of the associated ball valves. In order to avoid such malfunction, it is required to place restrictions on the maximum pressure to be used. Particularly, since the larger a valve bore, the larger a force exerted on a ball seat, the maximum pressure to be used must be restricted to a much lower level. The maximum pressure usable for each of the standardized ball seats is also specified in The Japan Petroleum Institute's Standard and The British Standard. Under the specified maximum pressure, however, problems resulting from creep still remain.

Why resistance to creep is necessary for ball valves will now be described.

When pressure is applied onto the upstream side of a ball valve kept closed, for example, it acts on a ball of the ball valve and consequently the ball compresses a ball seat on the downstream side of the ball valve. This compressing force causes deformation of the seat and consequently creep of the seat. After the downstream seat has undergone such creep as described above, when the application of pressure onto the upstream side is released, the ball supported between the downstream seat and a ball seat on the upstream side of the ball valve with the aid of their elastic deformation will descend by an amount corresponding to the creep quantity. In this state, when pressure is again applied onto the upstream side, a fluid leaks toward the downstream side through a gap formed by the descent of the ball. At this time, the ball valve has lost its sealing function. At the time of first application of pressure onto the upstream side, there is a fair possibility of the upstream seat being shifted from its fixed position toward a valve chamber between the ball and a valve body, with the result that the upstream seat undergoes creep. In this case, the upstream seat cannot support the ball thereon and, when the application of pressure onto the upstream side is released, the ball is allowed to descend. In order to avoid the aforementioned adverse phenomena, it is necessary for the seats to be protected from creep.

In view of the drawbacks suffered by PTFE, so-called reinforced PTFE has recently found widespread acceptance. The reinforced PTFE is formed by admixing glass fiber or carbon fiber with PTFE as described above and is superior in resistance to creep to PTFE per se. However, the superiority in resistance to creep is not so completely satisfactory. In addition, the cost of the PTFE reinforced with glass fiber and the cost of the PTFE reinforced with carbon fiber are about 1.3 times and about 2 times respectively that of PTFE per se.

Further, when the flow of such monomers as styrene is controlled with a ball valve having ball seats of PTFE or reinforced PTFE, the styrene permeates the seats and is polymerized therein to cause embrittlement of the seats, thereby giving rise to breakage of the seats and malfunction of the ball valve.

On the other hand, the aforementioned copolymer "PFA" is very excellent as a material for ball seats because it is difficult to permit permeation of such monomers as styrene, exhibits high resistance to creep, is capable of being used under high pressure and, even under the aforementioned maximum pressure usable, does not suffer from the problems resulting from creep and encountered by PTFE or reinforced PTFE. However, the cost of PFA is 5 to 10 times that of PTFE, resulting in very expensive products.

Under these circumstances, in this technical field there is now an increased demand for inexpensive ball seats excellent in resistance to creep and also in resistance to wear.

OBJECT AND SUMMARY OF THE INVENTION

The main object of the present invention is to provide a novel and useful material for valve seats, having excellent characteristics comparable to those of PFA over a wide range of temperatures, enjoying high resistance to wear, and satisfying any other condition necessary for valve seats attached particularly to a ball valve.

To attain the object described above, according to the present invention, there is provided a material for valve seats, which is a composite material comprising a base material composed of PTFE and 3 to 30% by weight of PFA based on the total amount of the base material, and 5 to 30% by weight of glass fiber or 5 to 25% by weight of carbon fiber based on the total amount of the composite material; and there is also provided a material for valve seats, which is a composite material comprising a base material composed of PTFE and 3 to 30% by weight of PFA based on the total amount of the base material, 5 to 30% by weight of glass fiber based on the total amount of the composite material and 5 to 25% by weight of powdered graphite or 3 to 10% by weight of molybdenum disulfide based on the total amount of the composite material.

The above and other objects, characteristic features and advantages of the present invention will become more apparent to those skilled in the art as the disclosure is made in the following description of preferred embodiments of the invention, as illustrated in the accompanying drawings.

DETAILED DESCRIPTION OF THE PREFERRED EMBODIMENTS

The present invention relates to a novel material for seats attached to and mounted on a valve for controlling the flow of a fluid, such as a ball valve, butterfly valve, etc.

One of the seat materials of the present invention is a composite material comprising a base material composed of PTFE excellent in resistance to friction, wear, chemicals and temperature and PFA excellent in resistance to creep, and 5 to 30% by weight of glass fiber based on the total amount of the composite material. This composite material is excellent in resistance to creep and superior in wear resistance to a mixture of PTFE and PFA which is the base material of the present invention. A seat made of this composite material is improved in wear coefficient about 100 times that of a seat made of PTFE alone. The composite material may contain 5 to 25% by weight of powdered graphite or 3 to 10% by weight of molybdenum disulfide based on the total amount of the composite material. In the case of adding powdered graphite in the aforementioned amount, the formed composite material is not only excellent in resistance to creep and wear, but also excellent in resistance to friction and particularly exhibits an effect of preventing occurrence of static electricity. In the case of adding molybdenum disulfide in the aforementioned amount, the formed composite material has its frictional coefficient made much lower and is capable of reducing the operation torque of an associated valve.

Another seat material of the present invention is a composite material comprising the aforementioned base material composed of PTFE and PFA, and 5 to 25% by weight of carbon fiber based on the total amount of the composite material. This composite material has material characteristics comparable to those of PTFE and exhibits high resistance to creep comparable to that of PFA, and particularly enjoys excellent resistance to creep and wear over a wide range of temperatures and manifests an effect of preventing occurrence of static electricity.

The amount of PFA in the base material of the composite material according to the present invention is preferably 3 to 30% by weight of the total amount of the base material. If the amount is less than the lower limit of the aforementioned range, the resistance to creep is insufficiently enhanced to fail to attain one of the objects of the present invention. If the amount is more than the upper limit, it is impossible to attain another object of the present invention which is to provide an inexpensive seat because the cost of PFA is about five to ten times the cost of PTFE.

Figure 1:
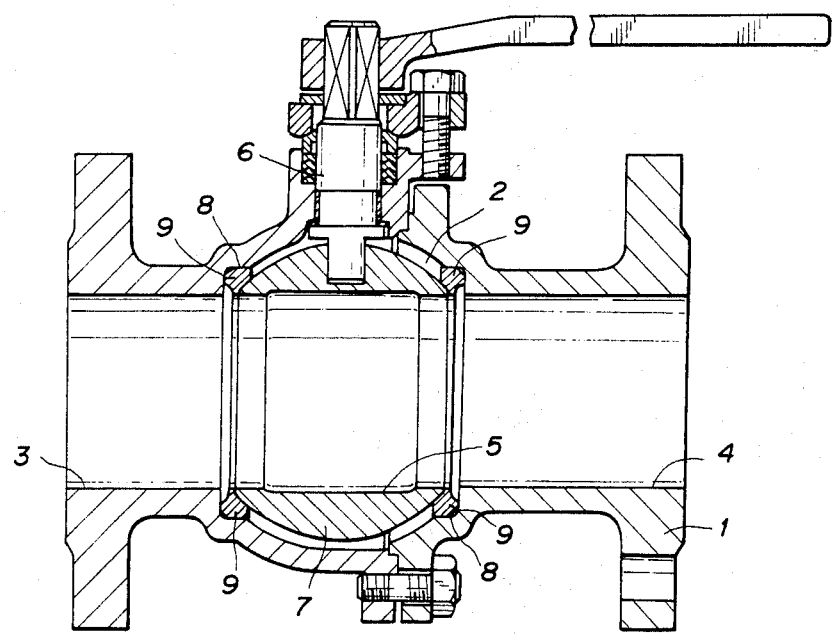
FIG. 1 is a longitudinal cross section illustrating a ball valve having attached thereto ball seats made of a novel material according to the present invention.

Referring to FIG. 1 showing a ball valve in longitudinal cross section provided with ball seats 9 which are molded from the novel material of the present invention, reference numeral 1 designates a valve body having a valve chamber 2 formed therein and also having inlet 3 and outlet 4 formed therein across the valve chamber 2 and communicating with the valve chamber 2. Denoted by numeral 7 is a ball of the ball valve, which has a through hole 5 formed therein and is rotatably assembled within the valve chamber 2. The ball 7 is rotated by a stem 6 coupled thereto between an open position at which the inlet and outlet 3 and 4 of the valve body 1 communicate with each other via the through hole 5 of the ball 7 accommodated within the valve chamber 2 of the valve body 1 and a closed position at which the communication between the inlet and outlet 3 and 4 is cut off by the ball 7. The seats are annular and are mounted on stepped portions 8 formed on the corners within the valve chamber 2 so as to be kept in seal contact with the ball 7. Although the number of the annular seats 9 is two in FIG. 1, one of them may be omitted.

Assuming that a given pressure is applied onto the ball 7 from the side of the inlet 3 when the ball valve is in a closed state, the ball 7 is urged toward the outlet 4 to compress the seat 9 on the side of the outlet 4. However, since the base material of the seat 9 of the present invention is composed of PTFE and PFA and is therefore excellent in resistance to creep, it can protect the ball valve from function deterioration unlike the conventional seat composed solely of PTFE liable to undergo under the aforementioned given pressure creep which causes the ball to descend and consequently the function of the ball valve to be lowered.

Since the seat 9 of the present invention has glass fiber incorporated in the aforementioned base material in an amount of 5 to 30% by weight based on the total amount of the seat 9, it is excellent in resistance to wear. Therefore, even if the ball 7 is repeatedly rotated between the open position and the closed position, the seat 9 is little worn off. Thus, the problem of lowering the sealing effect due to wear of the seat 9 can be completely solved.

Further, when the seat 9 has powdered graphite incorporated in the base material in an amount of 5 to 25% by weight based on the seat 9 in addition to the glass fiber, resistance to friction is further enhanced in addition to the improvement in resistance to wear, and static electricity preventing effect can be manifested. When the seat 9 has molybdenum disulfide incorporated in the base material in an amount of 3 to 10% by weight based on the total amount of the seat 9 in addition to the glass fiber, resistance to friction is further enhanced, and valve operating torque can be reduced to a large extent.

In order for the seat 9 to have effective resistance to wear, the seat 9 is composed of the base material and 5 to 30% by weight of glass fiber based on the total amount of the seat 9. The seat 9 is improved in wear coefficient about 100 times that of a seat made of PTFE alone.

Since the seat 9 of the present invention has carbon fiber incorporated in the base material in an amount of 5 to 25% by weight based on the total amount of the seat 9, it exhibits excellent resistance to creep over a wide range of temperatures. Further, since this seat 9 has high resistance to wear, if the ball 7 is repeatedly rotated between the open position and the closed position, the seat 9 is little worn off. Therefore, the problem of lowering the sealing effect due to wear of the seat can be completely solved. Further, static electricity preventing effect can be manifested.

With a view to wear resistance alone, powder of bronze, ceramic or aluminum may be incorporated, in place of glass fiber or carbon fiber, in the base material of PTFE and PFA to obtain a seat 9 of the present invention as occasion demands.

The seat 9 of the present invention is produced by blending powder of PTFE and powder of PFA into a mixture, adding glass fiber, carbon fiber or other materials described above in an respectively prescribed amount to the mixture, charging the resultant mixture into a mold set and compressing the resultant mixture in the mold set under heat. Any desired shape of seat can thus be produced with ease.

A base material of the present invention was prepared by blending PFA in an amount of 20% by weight based on the total amount of the base material with PTFE and was attached to and mounted on a ball valve having a normal diameter of 100 mm. Similarly, a ball seat molded solely of PTFE and that molded of PTFE reinforced with glass fiber were attached to and mounted on the same kind of ball valves respectively for the purpose of comparison. The three seats were tested for creep quantity after application of pressure for one hour. The results are as shown in FIGS. 2 and 3.

Figure 2:
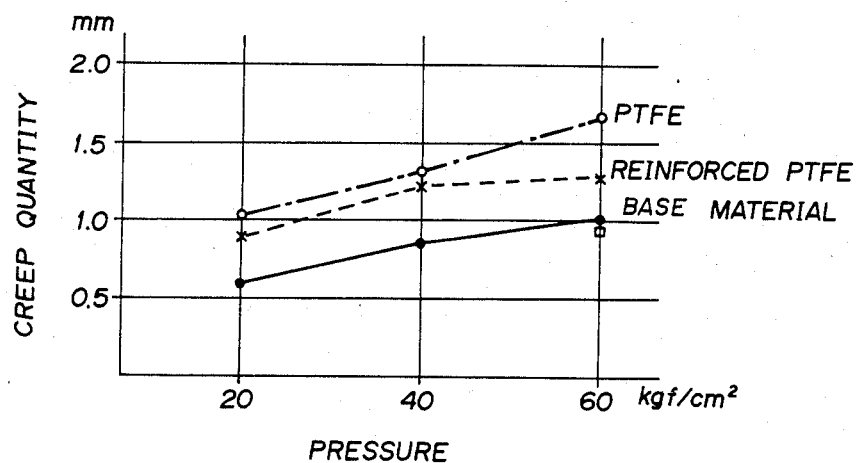
FIG. 2 is a graph showing the relation between the pressure and the creep quantity and illustrating results of the experiments conducted for testing for creep quantities of ball seats made of a base material of the present invention and, for the purpose of comparison, also testing for creep quantities of the conventional ball seats made solely of PTFE and of reinforced PTFE.
Figure 3:
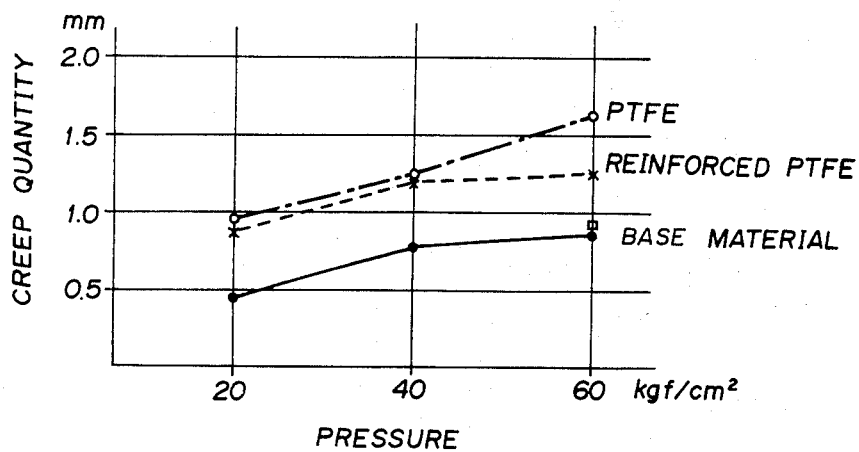
FIG. 3 is a graph showing the relation between the pressure and the creep quantity and illustrating results of the experiments conducted for testing for variations in creep quantity of the aforementioned three kinds of ball seats left standing for 24 hours.

To be more specific, in the graph of FIG. 2, the lateral axis is graduated for the pressure applied onto the ball 7 in FIG. 1 for a period of one hour and the longitudinal axis for the creep quantity of the seats in the axial direction thereof measured upon being detached from the ball valves immediately after the one-hour application of pressure. The blank circles ($\bigcirc$) on the chain line indicate the results of experiments conducted with respect to the seat made solely of PTFE, the crosses (x) on the dashed line those with respect to the seat made of PTFE reinforced with glass fiber, and the solid circles ($\bullet$) on the solid line those with respect to the seat made of the base material of the present invention, respectively. The three kinds of seats thus tested for creep quantity were left standing for 24 hours and then tested again for creep quantity. The results are as shown in FIG. 3. For the purpose of comparison, a seat made solely of PFA was attached to and mounted on the same kind of ball valve, a pressure of 60 kgf/cm$^2$ was applied to the ball for one hour, and the seat was immediately detached from the ball valve and tested for creep quantity. The result is as shown by a blank square ($\square$) in FIG. 2. The seat was also left standing for 24 hours and tested again for creep quantity. The result is as shown by a blank square ($\square$) in FIG. 3.

As is clear from the graph of FIG. 2, while the resistance to creep the seat of reinforced PTFE exhibited is enhanced though slightly in comparison with the seat of PTFE alone, the resistance to creep the seat of the base material according to the present invention exhibited is considerably enhanced. Specifically, the creep quantity of the seat of the base material produced after the one-hour application of pressure of 60 kgf/cm$^2$ is substantially the same as that of the seat of reinforced PTFE or PTFE alone produced after the one-hour application of pressure of 20 kgf/cm$^2$. According to The British Standard, it is specified that the maximum pressure usable for a seat made solely of PTFE, when being used relative to a valve having a normal diameter of 100 mm at a temperature of 50° C., is 42 bars (42.86 kgf/cm$^2$). Assuming that the creep quantity of the seat made solely of PTFE produced under the specified maximum pressure is an allowable limit, the seat made of the base material according to the present invention can be used under a pressure not less than twice the specified maximum pressure for the seat made solely of PTFE.

Thus, when a ball seat is manufactured as described above by using the base material according to the present invention, it not only has the excellent features of PTFE but also is comparable to a seat made solely of PFA in resistance to creep, lower in cost than a seat made solely of PFA and comparable in cost to a seat made of reinforced PTFE. Since the novel material of the present invention is composed of the base material and 5 to 30% by weight of glass fiber based on the total amount of the novel material, it can serve as a seat excellent in wear resistance. Further, since the novel material of the present invention is composed of the base material and 5 to 25% by weight of carbon fiber based on the total amount of the novel material, it can serve as a seat excellent in resistance to creep over a wide range of temperatures and in wear resistance and capable of exhibiting an excellent effect of preventing occurrence of static electricity. In this way, the ball seat of the present invention is capable of completely satisfying the conditions required for a ball seat. The novel material according to the present invention is thus greatly useful from a practical point of view.

While in the foregoing description the novel material according to the present invention has been applied to a material for seats of a ball valve, this is by no means limitative. For example, it may readily be used for a butterfly valve or any other valve requiring use of a seat without changing any of the characteristic features of the present invention.

What is claimed is:

1. A material for valve seats, which is a composite material comprising:
   a base material composed of polytetrafluoroethylene and 3 to 30% by weight of a copolymer of tetrafluoroethylene and perfluoroalkylvinylether based on the total amount of said base material, and 5 to 30% by weight of glass fiber based on the total amount of said composite material.

2. The material for valve seats according to claim 1, wherein said composite material further includes 5 to 25% by weight of powdered graphite based on the total amount of said composite material.

3. The material for valve seats according to claim 1, wherein said composite material further includes 3 to 10% by weight of molybdenum disulfide based on the total amount of said composite material.

4. A material for valve seats, which is a composite material comprising:
   a base material composed of polytetrafluoroethylene and 3 to 30% by weight of a copolymer of tetrafluoroethylene and perfluoroalkylvinylether based on the total amount of said base material, and 5 to 25% by weight of carbon fiber based on the total amount of said composite material.

5. A valve seat molded of a composite material comprising:
   a base material composed of polytetrafluoroethylene and 3 to 30% by weight of a copolymer of tetrafluoroethylene and perfluoroalkylvinylether based on the total amount of said base material, and 5 to 30% by weight of glass fiber based on the total amount of said composite material.

6. A valve including a valve seat molded of a composite material comprising:
a base material composed of polytetrafluoroethylene and 3 to 30% by weight of a copolymer of tetrafluoroethylene and perfluoroalkylvinylether based on the total amount of said base material, and 5 to 30% by weight of glass fiber based on the total amount of said composite material.

7. A valve according to claim 6, which is a ball valve.

8. A valve according to claim 6, which is a ball valve.

9. A valve seat molded of a composite material comprising:
a base material composed of a polytetrafluoroethylene and 3 to 30% by weight of a copolymer of tetrafluoroethylene and perfluoroalkylvinylether based on the total amount of said base material, and 5 to 25% by weight of carbon fiber based on the total amount of said composite material.

10. A valve including a valve seat molded of a composite material comprising:
a base material composed of polytetrafluoroethylene and 3 to 30% by weight of a copolymer of tetrafluoroethylene and perfluoroalkylvinylether, and 5 to 25% by weight of carbon fiber based on the total amount of said composite material.

* * * * *